United States Patent
Lu

(10) Patent No.: US 12,099,881 B2
(45) Date of Patent: Sep. 24, 2024

(54) BLOCKCHAIN SERVER COMPUTING CAPABILITY ALLOCATION METHOD AND SYSTEM

(71) Applicant: Liang Lu, Shanghai (CN)

(72) Inventor: Liang Lu, Shanghai (CN)

( * ) Notice: Subject to any disclaimer, the term of this patent is extended or adjusted under 35 U.S.C. 154(b) by 452 days.

(21) Appl. No.: 17/677,536

(22) Filed: Feb. 22, 2022

(65) Prior Publication Data

US 2023/0132657 A1   May 4, 2023

(30) Foreign Application Priority Data

Nov. 4, 2021   (CN) .......................... 202111299092.4

(51) Int. Cl.
   *G06F 3/00*   (2006.01)
   *G06F 9/48*   (2006.01)
   *G06F 9/50*   (2006.01)

(52) U.S. Cl.
   CPC .......... *G06F 9/5044* (2013.01); *G06F 9/4881* (2013.01)

(58) Field of Classification Search
   CPC ....................................................... G06F 9/50
   USPC ....................................................... 718/104
   See application file for complete search history.

(56) References Cited

U.S. PATENT DOCUMENTS

| | | | | |
|---|---|---|---|---|
| 2017/0372443 | A1* | 12/2017 | Katsuda | ............ G16H 50/20 |
| 2020/0195645 | A1* | 6/2020 | Wei | ............ H04L 9/3268 |
| 2021/0150623 | A1* | 5/2021 | Rostami | ............ G06Q 20/3676 |
| 2021/0166202 | A1* | 6/2021 | Chen | ............ G06Q 20/0652 |
| 2021/0240814 | A1* | 8/2021 | Sholtis | ............ G06F 21/45 |
| 2021/0295322 | A1* | 9/2021 | Xiao | ............ G06Q 20/0855 |
| 2022/0321364 | A1* | 10/2022 | Sholtis | ............ H04L 9/30 |

OTHER PUBLICATIONS

Bojana Koteska, Blockchain Implementation Quality Challenges: A Literature Review. (Year: 2017).*

* cited by examiner

*Primary Examiner* — Lechi Truong
(74) *Attorney, Agent, or Firm* — Chun-Ming Shih; LANWAY IPR SERVICES

(57) ABSTRACT

The method includes: acquiring, by a computing scheduling module, first sub-account information sent by a blockchain computing distribution module, wherein the blockchain computing distribution module includes a plurality of sub-accounts; scheduling, by the computing scheduling module, the blockchain server to provide computing capability for a first sub-account according to the first sub-account information: determining an up-to-standard result of the computing capability of the first sub-account, and feeding back the up-to-standard result to the computing scheduling module by the blockchain computing distribution module: scheduling the blockchain server to provide computing capability for a second sub-account when the computing scheduling module determines that the computing capability of the first sub-account is up to standard according to the up-to-standard result: or scheduling, by the computing scheduling module, and repeating the above steps until the computing capability of all sub-accounts is up to standard.

7 Claims, 2 Drawing Sheets

BLOCKCHAIN SERVER COMPUTING CAPABILITY ALLOCATION METHOD AND SYSTEM

TECHNICAL FIELD

The present invention relates to the technical field of blockchain server computing capability allocation, in particular to a blockchain server computing capability allocation method and system.

BACKGROUND

Blockchain consensus computing refers to a process of collecting unconfirmed transactions into a data block using a CPU or other dedicated hardware computing devices, and calculating an SHA-256 hash value of the data block after attaching a random adjustment number, repeatedly attempting the previous step until a random adjustment number which makes the generated hash value lower than a specific target is found, and obtaining corresponding rewards. The tool used in the blockchain consensus computing process is a blockchain server. A blockchain server computing capability represents computing capability of the blockchain server, which specifically represents the number of overall hash algorithm operation times of the blockchain server per second.

At present, each of the blockchain servers is configured with a sub-account, if the blockchain server is to provide computing capability to other sub-accounts, the blockchain server needs to be configured with sub-accounts, such that related art have the problems of cumbersome computing capability allocation process and inaccurate computing capability allocation of blockchain servers. In addition, in related art, one sub-account is configured with a plurality of blockchain servers, and when a blockchain server fails, the computing capability of the sub-account will be affected.

It should be noted that the sub-account is an account used by a blockchain computing distribution center to distribute money, and there may be a plurality of sub-accounts, each corresponding to a different user.

SUMMARY

In view of this, provided is a blockchain server computing capability allocation method and system, so as to solve the problems of inaccurate allocation results of the computing capability of a blockchain server and unstable computing capability of a sub-account in the related art.

The present invention adopts the following technical solution:

According to a first aspect, the present invention provides a blockchain server computing capability allocation method, including:

acquiring, by a computing scheduling module, first sub-account information sent by a blockchain computing distribution module, wherein the blockchain computing distribution module includes a plurality of sub-accounts;

scheduling, by the computing scheduling module, the blockchain server to provide computing capability for a first sub-account according to the first sub-account information;

determining an up-to-standard result of the computing capability of the first sub-account, and feeding back the up-to-standard result to the computing scheduling module, by the blockchain computing distribution module;

scheduling the blockchain server to provide computing capability for a second sub-account when the computing scheduling module determines that the computing capability of the first sub-account is up to standard according to the up-to-standard result; scheduling the blockchain server to continue to provide the computing capability for the first sub-account by the computing scheduling module when the computing scheduling module determines that the computing capability of the first sub-account is not up to standard according to the up-to-standard result; and repeating the above steps until the computing capability of all sub-accounts is up to standard.

Preferably, the first sub-account information includes the first sub-account and a blockchain consensus computing task corresponding to the first sub-account;

the step of scheduling, by the computing scheduling module, the blockchain server to provide computing capability for a first sub-account according to the first sub-account information includes:

sending the blockchain consensus computing task corresponding to the first sub-account to the blockchain server by the computing scheduling module;

computing a task result according to the blockchain consensus computing task corresponding to the first sub-account by the blockchain server;

feeding back the task result to the computing scheduling module by the blockchain server; and sending the task result to the blockchain computing distribution module by the computing scheduling module.

Preferably, the step of determining an up-to-standard result of the computing capability of the first sub-account by the blockchain computing distribution module includes:

determining the computing capability according to the task result by the blockchain computing distribution module;

adding, by the blockchain computing distribution module, the computing capability corresponding to the task result and an accumulated computing capability of the first sub-account to obtain a target computing capability of the first sub-account, wherein the accumulated computing capability of the first sub-account is computed according to a computing result of the blockchain server corresponding to the first sub-account received by the blockchain computing distribution module; and determining the up-to-standard result according to the target computing capability of the first sub-account and computing capability standard corresponding to the first sub-account by the blockchain computing distribution module.

Preferably, the first sub-account information further includes a blockchain computing distribution center address corresponding to the first sub-account;

the step of acquiring, by the computing scheduling module, the first sub-account information sent by the blockchain computing distribution module includes:

acquiring, by the computing scheduling module, the first sub-account information sent by the blockchain computing distribution module and the blockchain computing distribution center address corresponding to the first sub-account;

sending, by the computing scheduling module, authentication information to the blockchain computing distribution module according to the first sub-account and the blockchain computing distribution center address corresponding to the first sub-account;

feeding back an authentication result to the computing scheduling module according to the authentication information by the blockchain computing distribution module;

connecting to the blockchain computing distribution center corresponding to the first sub-account according to the authentication result by the computing scheduling module when the authentication result is successful;

sending, by the blockchain computing distribution module, a blockchain consensus computing task corresponding to the first sub-account to the computing scheduling module; and receiving, by the computing scheduling module, the blockchain consensus computing task corresponding to the first sub-account sent by the blockchain computing distribution module.

Preferably, the blockchain server computing capability allocation method of the present invention further includes: scheduling a standby blockchain server to provide the computing capability for the sub-account when the computing scheduling module determines that the blockchain server fails or the computing capability of the blockchain server is not up to standard.

According to a second aspect, the present invention further provides a blockchain server computing capability allocation system including: a blockchain server and a computing scheduling module;

wherein the computing scheduling module is configured to acquire sub-account information sent by an external blockchain computing distribution module and schedule the blockchain server to provide computing capability for the sub-account according to the sub-account information; the blockchain computing distribution module includes a plurality of sub-accounts; and the blockchain server is configured to provide the computing capability for the sub-account according to a scheduling instruction of the computing scheduling module.

Preferably, the blockchain server computing capability allocation system of the present invention further includes: a blockchain computing distribution module;

wherein the blockchain computing distribution module is configured to send sub-account information to the computing scheduling module, determine an up-to-standard result of the computing capability of the sub-account according to a scheduling result of the computing scheduling module, and feeding back the up-to-standard result to the computing scheduling module; and the computing scheduling module is further configured to determine a computing capability allocation result of the blockchain server according to the scheduling result.

Preferably, the computing scheduling module is specifically configured to:

acquire first sub-account information sent by the blockchain computing distribution module;

schedule the blockchain server to provide computing capability for a first sub-account according to the first sub-account information;

receive the up-to-standard result of the computing capability of the first sub-account fed back by the blockchain computing distribution module;

wherein the computing scheduling module schedules the blockchain server to provide the computing capability for a second sub-account when determining that the computing capability of the first sub-account is up to standard according to the up-to-standard result of the computing capability of the first sub-account; and the computing scheduling module schedules the blockchain server to continue to provide the computing capability for the first sub-account when determining that the computing capability of the first sub-account is not up to standard according to the up-to-standard result of the computing capability of the first sub-account.

The present invention adopts the above technical solution. A blockchain server computing capability allocation method includes: acquiring, by a computing scheduling module, first sub-account information sent by a blockchain computing distribution module, wherein the blockchain computing distribution module includes a plurality of sub-accounts; scheduling, by the computing scheduling module, the blockchain server to provide computing capability for a first sub-account according to the first sub-account information; determining an up-to-standard result of the computing capability of the first sub-account, and feeding back the up-to-standard result to the computing scheduling module by the blockchain computing distribution module; scheduling the blockchain server to provide computing capability for a second sub-account when the computing scheduling module determines that the computing capability of the first sub-account is up to standard according to the up-to-standard result; scheduling the blockchain server to continue to provide the computing capability for the first sub-account by the computing scheduling module when the computing scheduling module determines that the computing capability of the first sub-account is not up to standard according to the up-to-standard result; and repeating the above steps until the computing capability of all sub-accounts is up to standard. Based on this, it is possible in the present invention to divide and distribute the computing capability of one blockchain server to the sub-accounts without modifying the configuration of the blockchain server, thereby realizing the purpose of accurately dividing the computing capability of the blockchain server. In addition, with the technical solution of switching to another sub-account only when the computing capability of one sub-account is up to standard, and providing the computing capability for the other sub-account in the present invention, the stability of computing capability of each sub-account is ensured.

BRIEF DESCRIPTION OF THE DRAWINGS

To more clearly illustrate embodiments of the present invention or technical solutions in prior art, the following will briefly introduce the drawings that are desired to be used in the description of the embodiments or prior art. Obviously, the drawings in the following description are merely some embodiments of the present invention, and other drawings may also be obtained according to these drawings without exerting inventive effort by those ordinarily skilled in the art.

DESCRIPTION OF THE EMBODIMENTS

Figure 1:
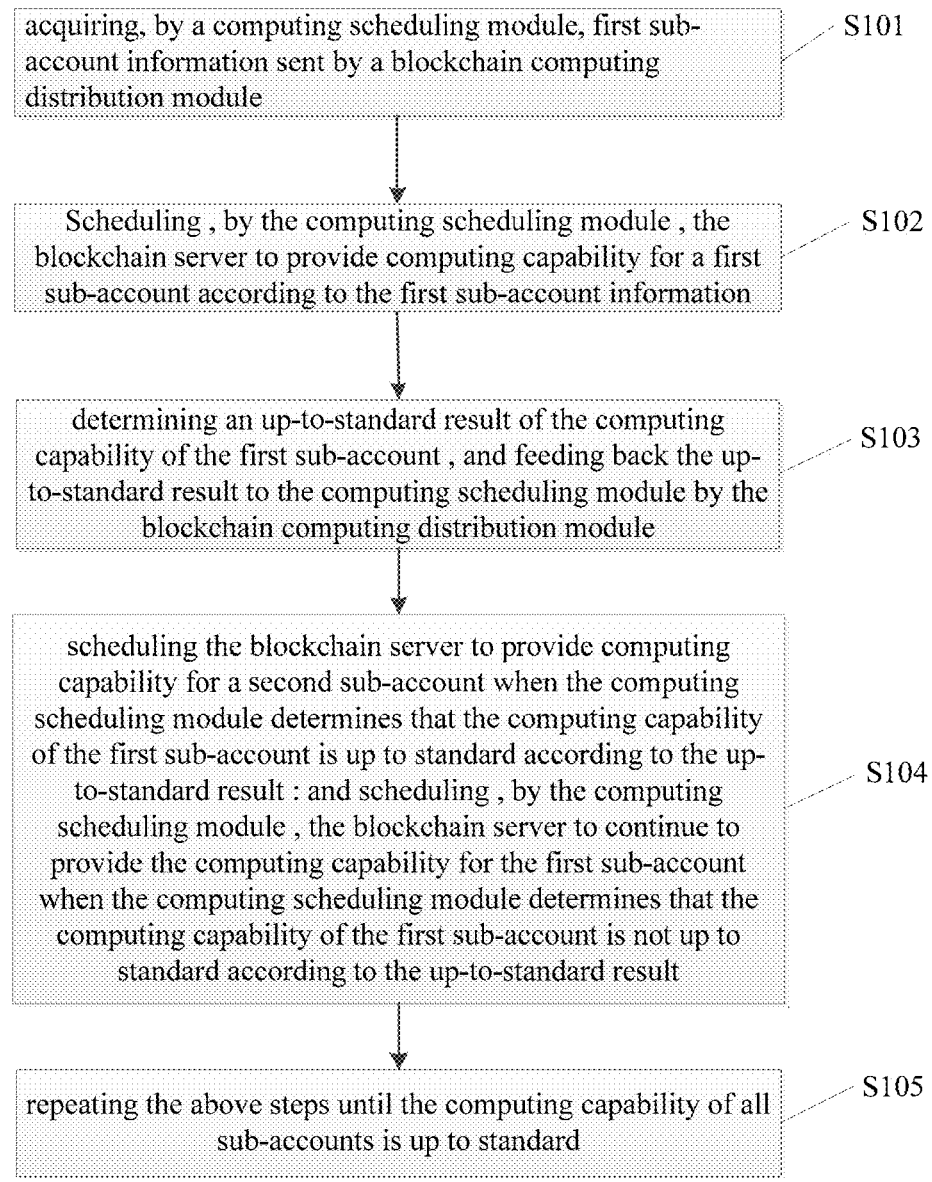
FIG. 1 is a flow diagram of a blockchain server computing capability allocation method provided by an embodiment of the present invention.

To make the objects, technical solutions and advantages of the present invention clearer, the technical solutions of the present invention will be described in detail below. Obviously, the described embodiments are only a part of the embodiments of the present invention, without covering all embodiments. All other embodiments that those of ordinary skill in the art obtain without creative efforts based on the embodiments of the present invention also fall within the scope of the present invention.

FIG. 1 is a flow diagram of a blockchain server computing capability allocation method provided by an embodiment of the present invention. As shown in FIG. 1, the blockchain server computing capability allocation method of this embodiment includes:

At S101, a computing scheduling module acquirers first sub-account information sent by a blockchain computing distribution module, wherein the blockchain computing distribution module includes a plurality of sub-accounts.

Specifically, the first sub-account information includes a first sub-account, a blockchain computing distribution center address corresponding to the first sub-account and a blockchain consensus computing task corresponding to the first sub-account.

The computing scheduling module acquires the first sub-account information sent by the blockchain computing distribution module, including:

the computing scheduling module acquires the first sub-account information sent by the blockchain computing distribution module and the blockchain computing distribution center address corresponding to the first sub-account;

the computing scheduling module sends authentication information to the blockchain computing distribution module according to the first sub-account and the blockchain computing distribution center address corresponding to the first sub-account;

the blockchain computing distribution module feeds back an authentication result to the computing scheduling module according to the authentication information;

the computing scheduling module is connected to the blockchain computing distribution center corresponding to the first sub-account according to the authentication result when the authentication result is successful;

the blockchain computing distribution module sends a blockchain consensus computing task corresponding to the first sub-account to the computing scheduling module; and the computing scheduling module receives the blockchain consensus computing task corresponding to the first sub-account sent by the blockchain computing distribution module.

More specifically, one sub-account corresponds to one user, and the blockchain computing distribution center corresponding to each of the sub-accounts can be the same or different. After being started, the computing scheduling module receives the sub-accounts of different users and the blockchain computing distribution center address corresponding to each of the sub-accounts. After connecting to the blockchain computing distribution center address corresponding to one of the sub-accounts, the computing scheduling module sends the authentication information corresponding to the sub-account to the blockchain computing distribution module. After the authentication is successful, the blockchain computing distribution module sends the blockchain consensus computing task of the authenticated sub-account to the computing scheduling module. Similarly, the computing scheduling module is connected to the blockchain computing distribution center corresponding to other sub-accounts, and receives the blockchain consensus computing tasks of other sub-accounts.

At S102, the computing scheduling module schedules the blockchain server to provide computing capability for a first sub-account according to the first sub-account information.

In detail, firstly, the computing scheduling module sends the blockchain consensus computing task corresponding to the first sub-account to the blockchain server; then, the blockchain server computes a task result according to the blockchain consensus computing task corresponding to the first sub-account, and feeds back the task result to the computing scheduling module; and finally, the computing scheduling module sends the task result to the blockchain computing distribution module.

At S103, the blockchain computing distribution module determines an up-to-standard result of the computing capability of the first sub-account, and feeds back the up-to-standard result to the computing scheduling module.

Specifically, at first, the blockchain computing distribution module determines the computing capability according to the task result; then, the blockchain computing distribution module adds the computing capability corresponding to the task result and an accumulated computing capability of the first sub-account to obtain a target computing capability of the first sub-account; wherein the accumulated computing capability of the first sub-account is computed according to a computing result of the blockchain server corresponding to the first sub-account received by the blockchain computing distribution module; and the accumulated computing capability of the first sub-account may be 0 or not, the accumulated computing capability of the first sub-account is 0 when the blockchain computing distribution module receives the computing result of the blockchain server corresponding to the first sub-account, otherwise, it is not 0. Finally, the blockchain computing distribution module determines the up-to-standard result according to the target computing capability of the first sub-account and computing capability standard corresponding to the first sub-account, that is, the blockchain computing distribution module determines whether the target computing capability of the first sub-account meets the computing capability requirement of the first sub-account, and the computing capability standard corresponding to the first sub-account is present in the blockchain computing distribution module in advance.

At S104, the computing scheduling module schedules the blockchain server to provide computing capability for a second sub-account when determining that the computing capability of the first sub-account is up to standard according to the up-to-standard result; and the computing scheduling module schedules the blockchain server to continue to provide the computing capability for the first sub-account when determining that the computing capability of the first sub-account is not up to standard according to the up-to-standard result.

Specifically, first, the computing scheduling module analyzes the up-to-standard result; when determining that the computing capability of the first sub-account is up to standard according to the up-to-standard result, the computing scheduling module switches to the second sub-account, connects to the blockchain computing distribution center corresponding to the second sub-account, receives the blockchain consensus computing task of the second sub-account issued by the blockchain computing distribution module, and schedules the blockchain server to provide computing capability for the second sub-account; and when determining that the computing capability of the first sub-account is not up to standard according to the up-to-standard result, the computing scheduling module continues to receive the blockchain consensus computing task of the first sub-account issued by the blockchain computing distribution module, and schedules the blockchain server to continue to provide the computing capability for the first sub-account.

At S105, the above steps are repeated until the computing capability of all sub-accounts is up to standard.

Specifically, the above steps realize allocating the computing capability of the blockchain server to the first sub-account so that the computing capability of the first sub-account meets the requirements of the sub-account, when the computing capability of the first sub-account meets the requirements of the sub-account, and the computing scheduling module allocates the computing capability of the blockchain server to the second sub-account so that the computing capability of the second sub-account meets the requirements of the sub-account. Similarly, when the computing capability of the second sub-account meets the requirements of the sub-account, the computing scheduling module allocates the computing capability of the blockchain server to other sub-accounts, so that the computing capability of each of the sub-accounts is up to standard, thereby dividing and distributing the computing capability of one blockchain server is to a plurality of sub-accounts and providing the computing capability for a plurality of sub-accounts.

This embodiment adopts the above technical solution. A blockchain server computing capability allocation method, includes: acquiring, by a computing scheduling module, first sub-account information sent by a blockchain computing distribution module, wherein the blockchain computing distribution module includes a plurality of sub-accounts; scheduling, by the computing scheduling module, the blockchain server to provide computing capability for a first sub-account according to the first sub-account information; determining an up-to-standard result of the computing capability of the first sub-account, and feeding back the up-to-standard result to the computing scheduling module by the blockchain computing distribution module; scheduling the blockchain server to provide computing capability for a second sub-account when the computing scheduling module determines that the computing capability of the first sub-account is up to standard according to the up-to-standard result; scheduling, by the computing scheduling module, the blockchain server to continue to provide the computing capability for the first sub-account when the computing scheduling module determines that the computing capability of the first sub-account is not up to standard according to the up-to-standard result; and repeating the above steps until the computing capability of all sub-accounts is up to standard. Based on this, it is possible in this embodiment to divide and distribute the computing capability of one blockchain server to the sub-accounts without modifying the configuration of the blockchain server, thereby realizing the purpose of accurately dividing the computing capability of the blockchain server. In addition, with the technical solution of switching to another sub-account only when the computing capability of one sub-account is up to standard, and providing the computing capability for the other sub-account in this embodiment, the stability of computing capability of each sub-account is ensured.

Preferably, the blockchain server computing capability allocation method of this embodiment further includes: scheduling a standby blockchain server to provide the computing capability for the sub-account when the computing scheduling module determines that the blockchain server fails or the computing capability of the blockchain server is not up to standard.

Specifically, the computing scheduling module can determine a situation that the blockchain server fails or the computing capability of the blockchain server is not up to standard according to instructions of the user, and can also determine the situation that the blockchain server fails or the computing capability of the blockchain server is not up to standard according to other methods capable of implementing the present application in the prior art. When the computing scheduling module determines that the blockchain server fails or the computing capability of the blockchain server is not up to standard, the computing scheduling module is connected to other blockchain servers that do not fail and the computing capability thereof is up to standard, and schedules the blockchain server to provide the computing capability for the sub-account. In this way, the stability of the computing capability of the sub-account is further ensured.

Based on a general inventive concept, the present invention further provides a blockchain server computing capability allocation system. The blockchain server computing capability allocation system of this embodiment includes: a blockchain server and a computing scheduling module;

wherein the computing scheduling module is configured to acquire sub-account information sent by an external blockchain computing distribution module and schedule the blockchain server to provide computing capability for the sub-account according to the sub-account information; the blockchain computing distribution module includes a plurality of sub-accounts; and the blockchain server is configured to provide the computing capability for the sub-account according to a scheduling instruction of the computing scheduling module.

Figure 2:
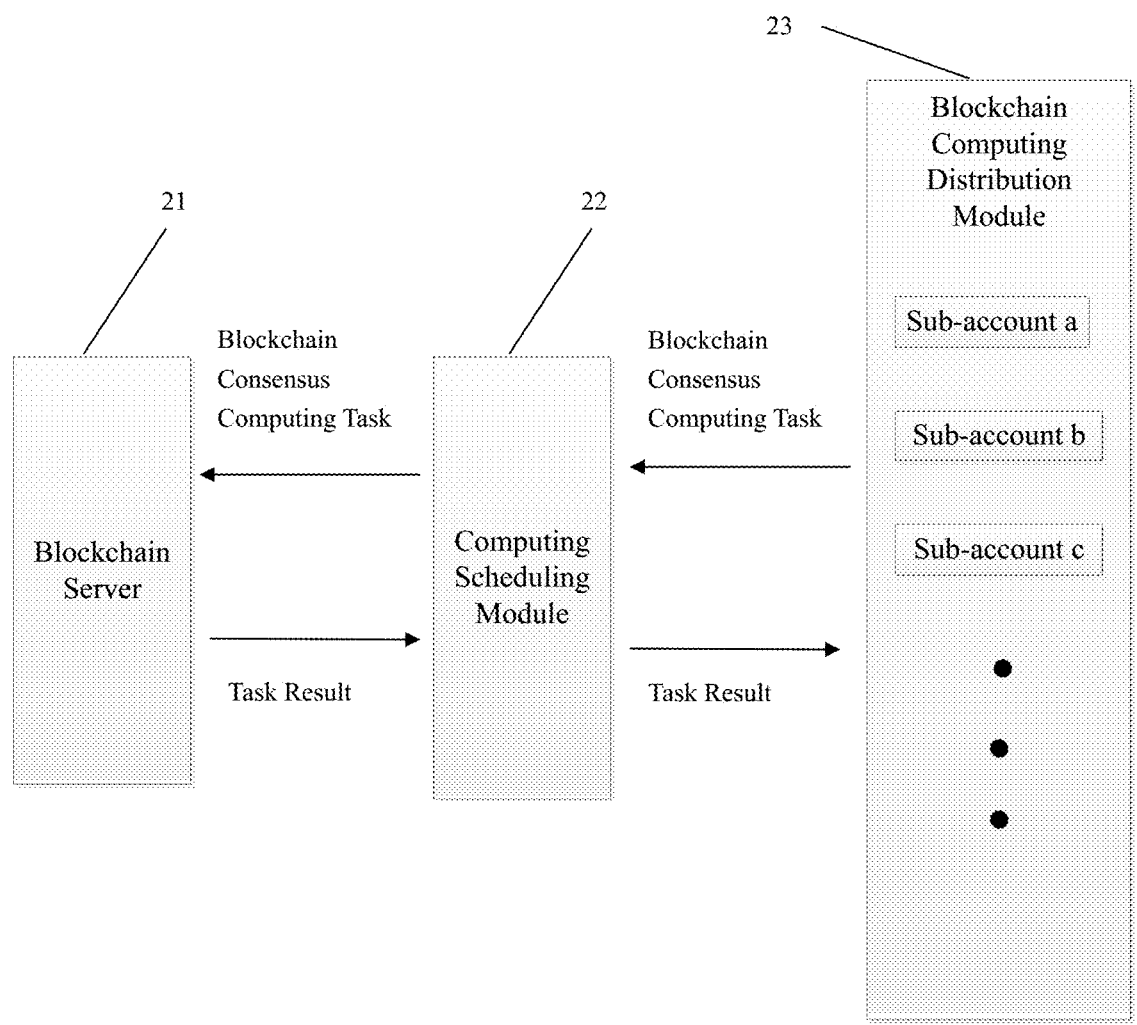
FIG. 2 is a structural schematic diagram of a blockchain server computing capability allocation system provided by the embodiment of the present invention.

The present invention further provides another blockchain server computing capability allocation system. FIG. 2 is a structural schematic diagram of a blockchain server computing capability allocation system provided by the embodiment of the present invention. The blockchain server computing capability allocation system of this embodiment is used for implementing the blockchain server computing capability allocation method of the above-mentioned embodiment. As shown in FIG. 2, the blockchain server computing capability allocation system of this embodiment includes: a blockchain server 21, a computing scheduling module 22, and a blockchain computing distribution module 23.

The computing scheduling module 22 is configured to acquire sub-account information sent by an external blockchain computing distribution module and schedule the blockchain server to provide computing capability for the sub-account according to the sub-account information; the blockchain computing distribution module includes a plurality of sub-accounts; and the blockchain server 21 is configured to provide the computing capability for the sub-account according to a scheduling instruction of the computing scheduling module. The blockchain computing distribution module 23 is configured to send sub-account information to the computing scheduling module, and determine an up-to-standard result of the computing capability of the sub-account according to a scheduling result of the computing scheduling module, and feed back the up-to-standard result to the computing scheduling module; and the computing scheduling module 22 is further configured to determine computing capability allocation result of the blockchain server according to the scheduling result.

Preferably, the computation scheduling module 22 is specifically configured to implement the following method:

acquiring first sub-account information sent by the blockchain computing distribution module;

scheduling the blockchain server to provide computing capability for a first sub-account according to the first sub-account information;

receiving the up-to-standard result of the computing capability of the first sub-account fed back by the blockchain computing distribution module;

wherein the computing scheduling module schedules the blockchain server to provide the computing capability for a second sub-account when determining that the computing capability of the first sub-account is up to standard according to the up-to-standard result of the computing capability of the first sub-account; and the computing scheduling module schedules the blockchain server to continue to provide the computing capability for the first sub-account when determining that the computing capability of the first sub-account is not up to standard according to the up-to-standard result of the computing capability of the first sub-account.

Preferably, the computing scheduling module 22 is further configured to schedule a standby blockchain server to provide the computing capability for the sub-account when determining that the blockchain server fails or the computing capability of the blockchain server is not up to standard.

It should be noted that the blockchain server computing capability allocation system of this embodiment and the blockchain server computing capability allocation method of the above-mentioned embodiments are based on a general inventive concept and share the same or corresponding execution process and beneficial effects, which will not be repeatedly described here.

It will be understood that the same or similar parts of the above embodiments may refer to each other, and contents not described in detail in some embodiments may refer to the same or similar contents in other embodiments.

It should be noted that in the description of the present invention, the terms "first", "second" and the like are used for descriptive purposes only and cannot be understood as indicating or implying relative importance. Furthermore, in the description of the present invention, "a plurality" means at least two unless otherwise stated.

Any process or method description in the flow diagram or otherwise described herein may be understood as, a module, fragment, or part of code representing one or more executable instructions for implementing steps of a particular logical function or process, and the scope of the preferred embodiments of the present invention encompasses additional implementations in which functions may be executed not in an order shown or discussed, including in a substantially simultaneous manner or in reverse order depending on the functions involved, as will be understood by those skilled in the art to which embodiments of the present invention pertain.

It should be understood that each of the parts of the present invention may be implemented by hardware, software, firmware, or a combination thereof.

In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit(s) having logic gates for implementing logic functions upon data signals, an application specific integrated circuit having appropriate logic gates, a programmable gate array(s) (PGA), a field programmable gate array (FPGA), etc.

It can be understood by those skilled in the art that all or part of the steps in the embodiments can be completed by the means that relevant hardware is instructed by a program, the program can be stored in a computer readable storage medium, and the program includes any one or combination of the steps of the method embodiments when being executed.

In addition, each functional unit in each embodiment of the present disclosure may be integrated in a processing module, or be physically independent, or two or more units are integrated in a module. The integrated module above may be implemented by hardware or by a software functional module. The integrated module implemented by the software functional module and sold or used as an independent product may be stored in a computer readable storage medium also.

The aforementioned storage medium may be a Read Only Memory (ROM), a magnetic disk or a Compact Disk-Read Only Memory (CD-ROM).

In the context of the description, descriptions of the reference terms "one embodiment", "some embodiments", "example", "specific example" or "some examples" etc. mean that specific features, structures, materials, or characteristics described in connection with the embodiment or example are included in at least one embodiment or example of the present invention.

In the description, schematic expressions of the above terms do not necessarily refer to the same embodiments or examples.

Further, the specific features, structures, materials or characteristics described may be combined in any one or more embodiments or examples in a suitable manner.

Although the embodiments of the present invention have been shown and described above, it is to be understood that the above-described embodiments are exemplary and cannot be construed as limiting of the present invention and that changes, modifications, substitutions and variations may be made to the above embodiments within the scope of the present invention by those of ordinary skill in the art.

What is claimed is:

1. A blockchain server computing capability allocation method comprising: acquiring, by a computing scheduling module, first sub-account information sent by a blockchain computing distribution module, wherein the blockchain computing distribution module comprises a plurality of sub-accounts; scheduling, by the computing scheduling module, the blockchain server to provide computing capability for a first sub-account according to the first sub-account information; determining, by the blockchain computing distribution module, an up-to-standard result of the computing capability of the first sub-account, and feeding back the up-to-standard result to the computing scheduling module; scheduling the blockchain server to provide computing capability for a second sub-account when the computing scheduling module determines that the computing capability of the first sub-account is up to standard according to the up-to-standard result; scheduling the blockchain server to continue to provide the computing capability for the first sub-account by the computing scheduling module when the computing scheduling module determines that the computing capability of the first sub-account is not up to standard according to the up-to-standard result; and repeating the above steps until the computing capability of all sub-accounts is up to standard;

wherein the first sub-account information comprises the first sub-account and a blockchain consensus computing task corresponding to the first sub-account; and the step of scheduling, by the computing scheduling module, the blockchain server to provide computing capability for a first sub-account according to the first sub-account information comprises: sending the blockchain consensus computing task corresponding to the first sub-account to the blockchain server by the computing scheduling module; computing a task result according to the blockchain consensus computing task corresponding to the first sub-account by the blockchain server: feeding back the task result to the computing scheduling module by the blockchain server; and sending the task result to the blockchain computing distribution module by the computing scheduling module.

2. The blockchain server computing capability allocation method of claim 1, wherein the step of determining an up-to-standard result of the computing capability of the first sub-account by the blockchain computing distribution module comprises: determining the computing capability according to the task result by the blockchain computing distribution module; adding, by the blockchain computing distribution module, the computing capability corresponding to the task result and an accumulated computing capability of the first sub-account to obtain a target computing capability of the first sub-account, wherein the accumulated computing capability of the first sub-account is computed according to a computing result of the blockchain server corresponding to the first sub-account received by the blockchain computing distribution module; and determining the up-to-standard result according to the target computing capability of the first sub-account and computing capability standard corresponding to the first sub-account by the blockchain computing distribution module.

3. The blockchain server computing capability allocation method of claim 1, wherein the first sub-account information further comprises a blockchain computing distribution center address corresponding to the first sub-account; and the step of acquiring, by the computing scheduling module, the first sub-account information sent by the blockchain computing distribution module comprises: acquiring, by the computing scheduling module, the first sub-account information sent by the blockchain computing distribution module and the blockchain computing distribution center address corresponding to the first sub-account;
    sending, by the computing scheduling module, authentication information to the blockchain computing distribution module according to the first sub-account and the blockchain computing distribution center address corresponding to the first sub-account; feeding back an authentication result to the computing scheduling module according to the authentication information by the blockchain computing distribution module; connecting to the blockchain computing distribution center corresponding to the first sub-account according to the authentication result by the computing scheduling module when the authentication result is successful; sending, by the blockchain computing distribution module, a blockchain consensus computing task corresponding to the first sub-account to the computing scheduling module; and receiving, by the computing scheduling module, the blockchain consensus computing task corresponding to the first sub-account sent by the blockchain computing distribution module.

4. The blockchain server computing capability allocation method of claim 1, further comprising: scheduling a standby blockchain server to provide the computing capability for the sub-account when the computing scheduling module determines that the blockchain server fails or the computing capability of the blockchain server is not up to standard.

5. A blockchain server computing capability allocation system comprising: processor, a blockchain server and a computing scheduling module; wherein the computing scheduling module is configured to acquire sub-account information sent by an external blockchain computing distribution module and schedule the blockchain server to provide computing capability for the sub-account according to the sub-account information; the blockchain computing distribution module comprises a plurality of sub-accounts; and the blockchain server is configured to provide the computing capability for the sub-account according to a scheduling instruction of the computing scheduling module;
    determining, by the blockchain computing distribution module, an up-to-standard result of the computing capability of the first sub-account, and feeding back the up-to-standard result to the computing scheduling module; scheduling the blockchain server to provide computing capability for a second sub-account when the computing scheduling module determines that the computing capability of the first sub-account is up to standard according to the up-to-standard result;
    scheduling the blockchain server to continue to provide the computing capability for the first sub-account by the computing scheduling module when the computing scheduling module determines that the computing capability of the first sub-account is not up to standard according to the up-to-standard result; and repeating the above steps until the computing capability of all sub-accounts is up to standard;
    wherein the first sub-account information comprises the first sub-account and a blockchain consensus computing task corresponding to the first sub-account; and the step of scheduling, by the computing scheduling module, the blockchain server to provide computing capability for a first sub-account according to the first sub-account information comprises: sending the blockchain consensus computing task corresponding to the first sub-account to the blockchain server by the computing scheduling module; computing a task result according to the blockchain consensus computing task corresponding to the first sub-account by the blockchain server:
    feeding back the task result to the computing scheduling module by the blockchain server; and
    sending the task result to the blockchain computing distribution module by the computing scheduling module.

6. The blockchain server computing capability allocation system of claim 5, further comprising: a blockchain computing distribution module; wherein the blockchain computing distribution module is configured to send sub-account information to the computing scheduling module, and determine an up-to-standard result of the computing capability of the sub-account according to a scheduling result of the computing scheduling module, and feed back the up-to-standard result to the computing scheduling module; and the computing scheduling module is further configured to determine computing capability allocation result of the blockchain server according to the scheduling result.

7. The blockchain server computing capability allocation system of claim 6, wherein the computing scheduling module is specifically configured to: acquire first sub-account information sent by the blockchain computing distribution module; schedule the blockchain server to provide computing capability for a first sub-account according to the first sub-account information; and receive the up-to-standard result of the computing capability of the first sub-account fed back by the blockchain computing distribution module, wherein the computing scheduling module schedules the blockchain server to provide the computing capability for a second sub-account when determining that the computing capability of the first sub-account is up to standard according to the up-to-standard result of the computing capability of the first sub-account; and the computing scheduling module schedules the blockchain server to continue to provide the computing capability for the first sub-account when determining that the computing capability of the first sub-account is not up to standard according to the up-to-standard result of the computing capability of the first sub-account.

* * * * *